Figure 1:
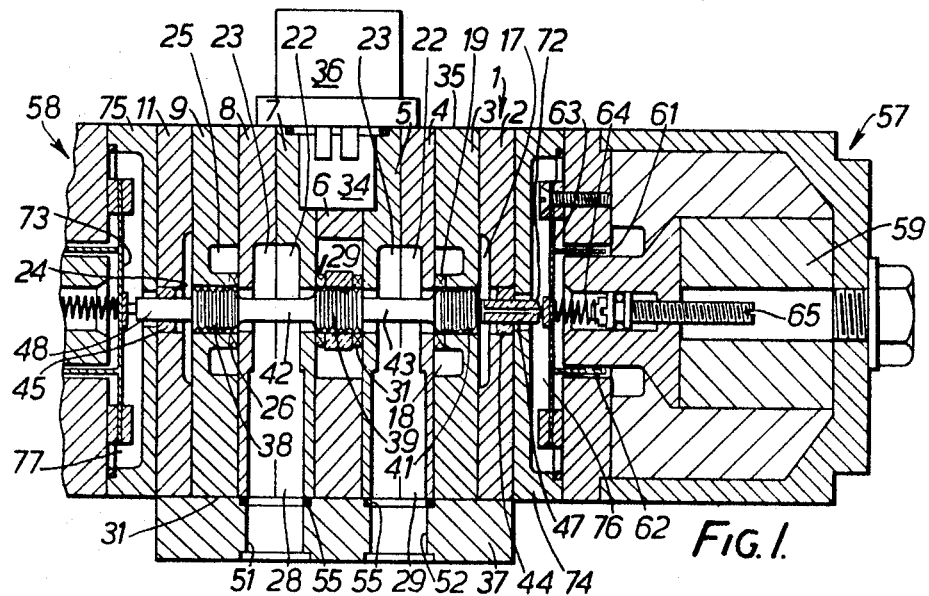

United States Patent

[11] 3,598,152

| [72] | Inventor | Thomas Desmond Hudson Andrews<br>Leckhampton Hill, England |
|---|---|---|
| [21] | Appl. No. | 835,686 |
| [22] | Filed | June 23, 1969 |
| [45] | Patented | Aug. 10, 1971 |
| [73] | Assignee | Dowty Technical Developments Limited<br>Brockhampton, Cheltenham, England |
| [32] | Priority | June 26, 1968 |
| [33] | | Great Britain |
| [31] | | 30402/68 |

[54] PISTON VALVES
4 Claims, 11 Drawing Figs.

[52] U.S. Cl. .................................................137/625.61,
251/367
[51] Int. Cl. .................................................... F16k 31/06
[50] Field of Search........................................... 137/259,
625.61, 625.62, 625.63, 625.64, 625.68, 625.67,
625.69; 251/367, 366

[56] References Cited
UNITED STATES PATENTS

| 2,807,280 | 9/1957 | Kittredge..................... | 251/367 X |
| 2,973,746 | 3/1961 | Jupa............................. | 137/625.64 X |
| 3,384,122 | 5/1968 | Harpman...................... | 137/625.64 |
| 3,457,956 | 7/1969 | Andrews ...................... | 137/625.61 |

FOREIGN PATENTS

| 1,108,028 | 5/1961 | Germany...................... | 137/625.68 |

Primary Examiner—M. Cary Nelson
Assistant Examiner—Robert J. Miller
Attorney—Young & Thompson ABSTRACT: A piston valve having a body formed of a plurality of metal sheets secured together in surface to surface relation by brazing to form a block, the bore and the ports for the piston valve being formed as holes and recesses in the sheets before brazing whereby a minimum of machining operations are necessary after the brazing has been effected. The surface dimensions of the sheets before brazing are each not substantially less than the axial length of the bore through the finished block whereby the block is of substantial strength to resist distortion which might be applied to it during use.

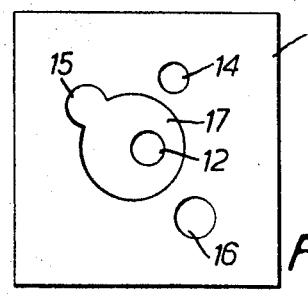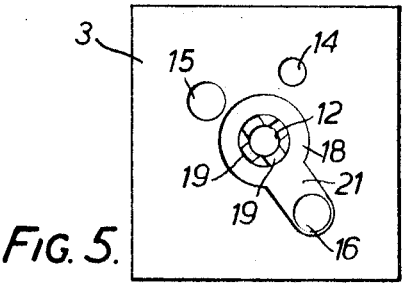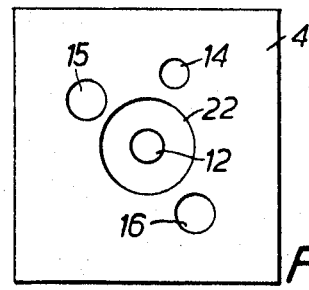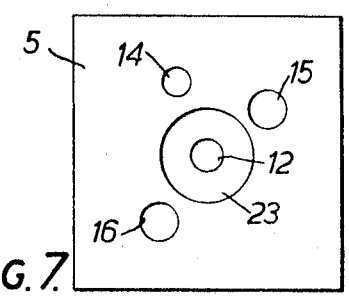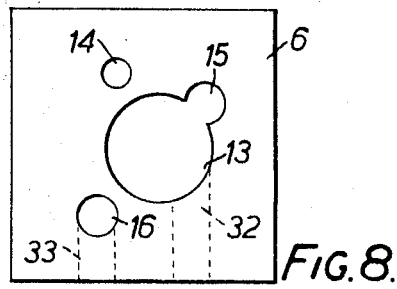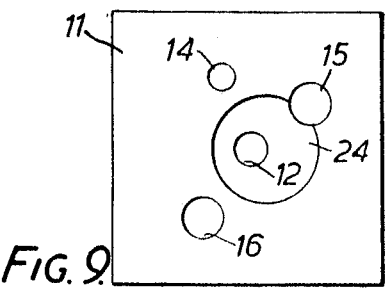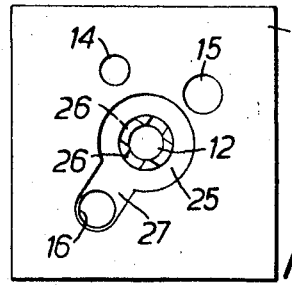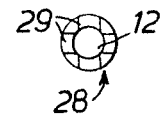

3,598,152

PISTON VALVES

This invention relates to piston valves.

In accordance with the present invention a piston valve includes a body formed with a plurality of metal sheets secured together in surface to surface relation by brazing or like process to form a block, a cylindrical bore extending transversely through the sheets of the block, and a spool valve member mounted in the bore to cooperate with ports opening into the bore, which ports are formed by zones of some of the sheets cut away before the brazing or like process, the surface dimensions of each sheet being at least not substantially less than the axial length of the bore through the block, whereby the block is of substantial strength and able to resist distortion by substantial forces which might be applied to it during use.

Where the piston valve is intended for accurate control of fluid flow, the working clearance between the spool valve member and the bore is extremely small and the distortion of the bore resulting from forces applied to the block must be adequately resisted in order that the spool valve member should not be jammed in the bore.

For preference, the mounting of the block in use is such that only small bending forces are exerted on the block and in accordance with a further feature of the invention such a mounting comprises a metal plate adapted to be secured by screw-threaded bolts to a flat outer surface of the block, fluid flow passages in the plate being adapted by means of sealing rings to make fluidtight connection with ports opening into the flat surface of the block, and securing means operative on the plate to secure the block in its operative position, the plate being provided with fluid flow connections by which the passages in the plate are connected for use.

The plate is arranged by virtue of the screw-threaded bolts and the sealing rings so as not to exert any excessive bending forces on the block, and any excessive force that might be exerted, for example by an unskilled mechanic, in securing the valve in position is exerted on the metal plate rather than on the block.

The fluid flow connections on the plate may comprise ports opening into a flat surface of the plate and arranged by sealing rings to make sealing connection with circular ports in the mounting surface for the whole valve.

The piston valve may be part of an electrohydraulic servo valve in which one or two electric force motors are secured to the block and arranged by servo vent means to adjust the axial position of the spool valve member within its bore.

The or each force motor may comprise a coil of wire movably supported in a magnetic field, whereby electric current passing through the coil causes the coil to exert a force.

The force generated by the force motor may be arranged to control leakage flow of liquid from a vent nozzle whereby to control fluid pressure upstream of the vent nozzle, the controlled pressure being arranged to act on the piston valve member to adjust its axial position.

The nozzle may be carried by the piston valve member whereby the latter will follow the movement of the force motor.

Figure 2:
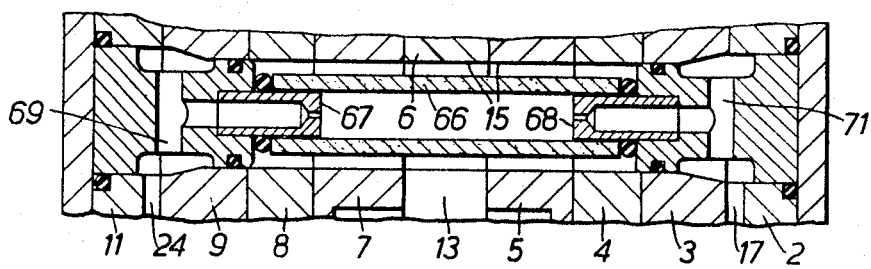
Figure 3:
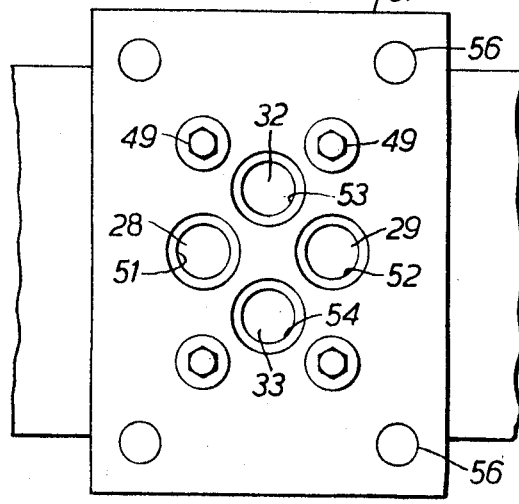

One embodiment of the invention forming part of an electrohydraulic servo valve will now be particularly described with reference to the accompanying drawings in which, FIG. 1 is a cross section through the servo valve, FIG. 2 is a cross section through a part of the valve on a larger scale and in a plane parallel to the section of FIG. 1, FIG. 3 is a view of the mounting plate for the servo valve, and FIGS. 4—11 are views of the elements forming the valve block.

The valve block 1 is formed of nine sheet metal plates indicated by the numerals 2—11 and shown also in elevation in FIGS. 4—10, the plates being secured together in surface to surface relation by copper brazing so as to form a block. Each of the plates is of square shape and the length of each side of the square is slightly smaller than the total thickness of the assembled block. Before the plates are brazed together each is cut away at varying positions as by drilling of holes and forming a recess. In each of the plates 2, 3, 4, 5, 7, 8, 9 and 11 a central hole 12 is formed of only very slightly smaller diameter than the diameter of the intended bore through the block. Within the plate 6 a considerably larger hole 13 is bored through the plate. Also each of the plates includes three holes 14, 15 and 16 bored therein, these holes when the plates are brazed into a block forming three complete holes extending completely through the block. The relative positioning of these holes does not appear exactly the same through FIGS. 4—10 since these FIGS. have been selected to show surfaces of the plates particularly to illustrate the positioning of recesses therein which do not extend to both surfaces.

The plate 2 (FIG. 4) has a circular recess 17 extending from the one surface and interconnecting the holes 15 and 12. The plate 3 (FIG. 5) has an annular recess 18 formed therein surrounding the hole 12 representing an annular ridge through which four rectangular section grooves 19 extend to connect the recess 18 to the hole 12. The recess 18 is extended at 21 to connect to the hole 16.

The plates 4 and 7 are identically formed and are illustrated at FIG. 6. More particularly a circular recess 22 from one surface surrounds and connects to the hole 12.

The plates 5 and 8 are again identical and are shown in FIG. 7. A recess 23 extends from one surface and connects to the hole 12.

The plate 6 is shown in FIG. 8. The large hole 13 therein connects to the hole 15.

The plate 11 is shown in FIG. 9 and here a circular recess 24 from one surface interconnects the holes 12 and 15.

The plate 9 is shown in FIG. 10. An annular recess 25 from the one surface surrounds the hole 12 leaving an annular portion of the surface around the hole 12 through which four grooves 26 of rectangular section extend to connect to the hole 12. The annular recess 25 is extended at 27 to connect to the hole 16.

When the plates are brazed together a central member 28 shown in FIG. 11 is centrally located within the hole 13 of plate 6. The member 28 is an annular member whose central hole 12 is aligned with the holes 12 in the plates. At each end of the member 28 four rectangular section grooves 29 at one end and at 31 at the other end are formed.

To construct the block the four plates are secured together by suitable clamps, a ceramic rod extending through the holes 12 and locating the member 28 centrally of the hole 13 in the plate 6. The ceramic rod is an accurate fit within the holes 12 and ensures that the holes are located coaxially with a high degree of accuracy. Between each adjacent pair of plates a thin copper shim is positioned and brazing is effected by heating the clamped up plates in an induction furnace. After the brazing operation the ceramic rod is removed and various machining operations are carried out on the block. The machining operations include the following:

A. The drilling of two holes 28 and 29 from the surface 31 of the block to intersect the adjoining recesses 22 and 23 of plates 4 and 5 on the one hand and plates 7 and 8 on the other hand.

B. The drilling of holes 32 and 33 from the surface 31 to intersect the holes 13 and 16. The hole 32 intersecting the hole 13 (shown in dotted lines in FIG. 8) forms a pressure supply connection and the hole 33 intersecting the hole 16 (FIG. 8) is the return connection.

C. Honing the hole 12 to make a smooth bore.

D. Boring a recess 34 from the surface 35 of the block to intersect the hole 14. The purpose of hole 34 is to form a location for a connecting box 36 from which conducting wires extend through the hole 14 in the block in either direction to the electric force motors located at either end thereof.

E. Drilling and tapping screw-threaded holes in various surfaces of the block in particular to facilitate the attachment of the force motors, the mounting plate 37 and the connecting box 36.

F. Surface grinding at least the surface 31 of the block to facilitate hydraulic connections to the four holes 28, 29, 32 and 33.

A piston valve member is slidably mounted in the completed bore 12 this piston valve member comprising three lands 38, 39 and 41 interconnected by a pair of rods 42 and 43. The axial length of the central land 39 is exactly equal to the axial length of the member 28 and in the neutral position of the piston valve the land 39 will just close the rectangular holes 29 and 31. These rectangular holes are formed in the brazing process by closing of the slots in the member 28 by the surfaces of the adjoining plates 5 and 7. The rectangular holes become metering slots. Also in the neutral position of the piston valve the land 38 will just close the metering slots formed by the rectangular holes 26 in the plate 9 closed by the adjacent surface of the plate 8 in the brazing process. Also in the neutral position the land 41 will just close the metering slots formed by the rectangular holes 19 closed by the adjacent surface of the plate 4 in the brazing process. The rectangular holes 19 and 26, 29 and 31 all become metering slots.

The ends of the hole 12 appearing in the plates 2 and 11 have bushes 44 and 45 inserted therein which are a close working fit on a pair of nozzles 47 and 48 extending from either end of the piston valve.

A mounting plate 37 is provided for mounting the block in its operative position. This plate 37 is secured by four screw-threaded bolts 49 to screw-threaded holes within the block. The plate 37 includes four fluid flow passages 51, 52, 53 and 54 which engage in a fluidtight manner by virtue of seals 55 respectively with the holes 28, 29, 32 and 33 in the block. The plate 37 will be secured to the block 1 in the factory under controlled conditions so that it exerts no undue bending forces on the block 1. For mounting the block in its operative position the plate 37 may be provided with any conventional securing means. In the illustrated embodiment the plate includes four screw-threaded bolt holes 56 by which the valve may be mounted on a cooperating surface. In mounting the valve the passages 51, 52, 53 and 54 will cooperate with appropriate ports in the mounting surface, sealing rings being provided for each port to ensure fluidtight connection. If the valve is mounted in position by an unskilled mechanic who exerts excessive force on the holding bolts any resulting distortion on the plate 38 will only be transferred in a small degree to the block 1 whose dimensions are such as to ensure that it is quite resistant to distorting forces.

A pair of force motors 57 and 58 are mounted one Adjustment each end of the block by means of screw-threaded bolts (not shown). Only force motor 57 is shown in detail, the force motor 58 being identical in construction. The major part of each force motor is the cylindrical permanent magnet 59 intended to produce an intense magnetic field within an annular magnetic gap 61 adjacent to the nozzle 47. Within the annular gap 61 an annular coil of wire 62 is mounted by means of a spring diaphragm 63, the coil and diaphragm being capable of axial movement in the magnetic field when current passes through the coil. The diaphragm closely cooperated with the end of the nozzle 47 to control the flow of liquid at pressure from this nozzle. Adjustment for the diaphragm and coil is provided by means of a compression spring 64 located in a convenient recess in the magnet structure 59 and adjustable by means of a screw hole 65 accessible from the outside of the magnet structure.

Referring now to FIG. 2 the holes 15 are shown on a larger scale extending through the block. The hole 13 will make connection to the holes 15 to supply liquid at pressure. Within the holes 15 a sleeve 66 of porous material is provided through which the pressure liquid may pass to a pair of fixed restrictors 67 and 68 on which the sleeve 66 is mounted. From restrictor 67 a connection extends through a passage 69 into the recess 24 of plate 11. Similarly the restrictor 68 is connected through a passage 71 with the recess 17 of plate 2.

The recess 17 of plate 1 connects to a passage 72 in the jet nozzle 47 and flow of liquid permitted from nozzle 47 depends on the relative position of the adjacent diaphragm 63. Similarly the diaphragm 73 of the force motor 58 will adjust flow from the jet nozzle 48.

At each end of the block the force motors 57 and 58 include light-alloy spacing members 74 and 75 secured against the block and providing collecting spaces 76 and 77 for liquid escaping from the nozzles. These collecting spaces are connected appropriately to the holes 16 which carry return flow of liquid.

For operation high pressure liquid is supplied to the port 53 from whence it flows to holes 32, 13 and 15. In hole 13 liquid has access to the metering slots 29 and 31. In the holes 15 liquid will pass through the filter sleeve 66, the two restrictors 67 and 68 and recesses 24 and 17 to the jet nozzles 47 and 48. The escape flow of liquid from the two nozzles 47 and 48 depends on the clearances permitted at the nozzles by the diaphragms 63 and 73. The flows permitted by the two diaphragms will determine the flow through the fixed restrictors 67 and 68 and will thus determine the reduced pressures which are operative in the recesses 17 and 24 to act on the annular areas of the lands 38 and 41 presented in these recesses. The piston valve will move substantially until the pressures in the recesses 17 and 24 are equalized and the piston valve will then open particular areas of the metering slots 19, 26, 29 and 31 which will determine particular flow rates of liquid through the holes 28 and 29 which are connected to a service to be controlled. Depending on the movement of the piston valve in one direction or the other from its neutral position flow and return will take place in one direction or the other through the holes 28 and 29, the liquid at pressure being supplied from the hole 33 and the return liquid escaping through the hole 32.

The methods of electrically connecting together and energizing the coils in the force motors are numerous and depend on the intended operation of the servo valve. One method of connection and operation of the force motor forms a subject of Shore's application Ser. No. 835,683.

The diaphragms 63 and 73 may be constructed as disclosed in Daubeney and Shore's application Ser. No. 835,684. The nozzles 47 and 48 and the fixed restrictors 67 and 68 may be arranged as disclosed in Goddard's application Ser. No. 835,685.

While the invention has been particularly described with reference to an electrohydraulic servo valve it will be appreciated that within the scope of the present invention the valve may be arranged for operation by any means which may for example comprise direct electrical operation, direct hydraulic operation, or direct mechanical operation. The invention discloses a construction of valve in which the metering ports may be accurately disposed along a bore carrying the piston valve member and the piston valve member may be very accurately machined to fit the bore with a minimum of working clearance. Since the majority of the machining for the ports is effected before the plates are made into a block all the machined ports and passages may be scrupulously cleaned before assembly to reduce the particles of metal left by machining.

I claim:

1. A piston valve including a body formed of a plurality of metal sheets secured together in surface to surface relation by brazing or the like process to form a block, a cylindrical bore extending through the block transversely through the sheets of the block, a spool valve member mounted in the bore to cooperate with ports opening into the bore, which ports are formed by zones of some of the sheets cut away before the brazing or like process, the surface dimensions of the sheets being at least not substantially less than the axial length of the bore through the block whereby the block is of substantial strength and able to resist distortion by substantial force which might be applied to it during use, one or more electric force motors secured to the block, servo vent means controlled by the force motor or motors to adjust the axial position of the spool member within its bore, the or each force motor comprising a coil of wire movably supported in a magnetic field.

2. A piston valve including a body formed of a plurality of metal sheets secured together in surface to surface relation by brazing or the like to form a block, a cylindrical bore extending through the block transversely through the sheets of the block, a spool valve member mounted in the bore to cooperate with ports opening into the bore, which ports are formed by zones of some of the sheets cut away before the brazing or like process, the surface dimensions of the sheets being at least not substantially less than the axial length of the bore through the block, whereby the block is of substantial strength and able to resist distortion by substantial force which might be applied to it during use, one or more electric force motors secured to the block, servo vent means controlled by the force motor or motors to adjust the axial position of the spool member within its bore, said servo vent means including a vent nozzle for the or each force motor carried by the spool valve such that the spool valve will follow the movement of the force motor or motors.

3. A piston valve as claimed in claim 2 wherein the plates are each formed with a second hole so arranged that the second holes produce a passage through the block when the plates are brazed together, one or more of the plates being formed by appropriate recesses before brazing so that its second hole is connected to a port opening into the bore, and fixed restrictor means mounted in the said second holes to control fluid flow to said vent nozzle or nozzles.

4. A piston valve as claimed in claim 3 including a third hole formed in each metal sheet which holes after brazing of the sheets form a passage appropriately connected to ports in the bore to carry return flow fluid from such ports.